United States Patent
Rothman et al.

(10) Patent No.: US 7,146,512 B2
(45) Date of Patent: Dec. 5, 2006

(54) METHOD OF ACTIVATING MANAGEMENT MODE THROUGH A NETWORK FOR MONITORING A HARDWARE ENTITY AND TRANSMITTING THE MONITORED INFORMATION THROUGH THE NETWORK

(75) Inventors: Michael A. Rothman, Gig Harbor, WA (US); Vincent J. Zimmer, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 470 days.

(21) Appl. No.: 10/611,168

(22) Filed: Jun. 30, 2003

(65) Prior Publication Data

US 2004/0268113 A1  Dec. 30, 2004

(51) Int. Cl.
*G06F 1/26* (2006.01)
(52) U.S. Cl. .................. 713/310; 713/300; 713/320
(58) Field of Classification Search ............... 713/1, 713/2, 100, 153, 300, 310, 320
See application file for complete search history.

(56) References Cited

U.S. PATENT DOCUMENTS

| | | | | |
|---|---|---|---|---|
| 5,339,450 A | * | 8/1994 | Nagahara | 717/170 |
| 5,758,157 A | | 5/1998 | Greenstein et al. | |
| 6,122,732 A | * | 9/2000 | Ahuja | 713/1 |
| 6,128,732 A | * | 10/2000 | Chaiken | 713/2 |
| 6,230,286 B1 | * | 5/2001 | Shapiro et al. | 714/23 |
| 6,243,809 B1 | * | 6/2001 | Gibbons et al. | 713/1 |
| 6,633,940 B1 | * | 10/2003 | Alasti et al. | 710/262 |
| 6,658,557 B1 | * | 12/2003 | McCoy et al. | 712/227 |
| 6,944,854 B1 | * | 9/2005 | Kehne et al. | 717/168 |
| 2001/0056518 A1 | * | 12/2001 | Maeda | 711/103 |
| 2003/0041273 A1 | * | 2/2003 | Wang | 713/300 |
| 2003/0079061 A1 | * | 4/2003 | Azzarito et al. | 710/5 |
| 2003/0172940 A1 | * | 9/2003 | Rogers et al. | 128/899 |
| 2003/0187618 A1 | * | 10/2003 | Inda et al. | 702/188 |
| 2004/0010579 A1 | * | 1/2004 | Freese | 709/223 |
| 2004/0148237 A1 | * | 7/2004 | Bittmann et al. | 705/35 |
| 2004/0215951 A1 | * | 10/2004 | Chen et al. | 713/1 |
| 2004/0260847 A1 | * | 12/2004 | Pereira | 710/15 |
| 2005/0081112 A1 | * | 4/2005 | Aguilar et al. | 714/39 |
| 2005/0114639 A1 | * | 5/2005 | Zimmer | 712/244 |
| 2005/0204190 A1 | * | 9/2005 | Cromer et al. | 714/14 |

* cited by examiner

*Primary Examiner*—Thomas Lee
*Assistant Examiner*—Malcolm Cribbs
(74) *Attorney, Agent, or Firm*—Blakely, Sokoloff, Taylor & Zafman LLP

(57) ABSTRACT

A method and system to implement a virtual out-of-band management controller. A management mode of operation of a processing system is activated in response to a signal received via a network. A portion of code copied from a firmware unit into system memory of the processing system is executed during the management mode of operation to interact with at least one hardware entity of the processing system. A runtime monitor is further executed during the management mode of operation to determine information about the at least one hardware entity via executing the portion of code and to transmit the information over the network. Subsequently, the management mode of operation is deactivated.

28 Claims, 8 Drawing Sheets

METHOD OF ACTIVATING MANAGEMENT MODE THROUGH A NETWORK FOR MONITORING A HARDWARE ENTITY AND TRANSMITTING THE MONITORED INFORMATION THROUGH THE NETWORK

TECHNICAL FIELD

This disclosure relates generally to out-of-band management controllers, and in particular but not exclusively, relates to implementing the functionality of a service processor using software.

BACKGROUND INFORMATION

In the field of computing systems, an out-of-band management controller is usually an independent processor, such as a base management controller or service processor, connected to various hardware components of high-end computing systems to monitor the functionality of the various hardware components. These service processors typically have their own independent link to a network with an independent internet protocol ("IP") address to allow an administrator on a remote console to monitor the functionality of the high-end computing system.

A web server is an example of a high-end computing system typically having a service processor. Referring to FIG. 1, a server 105 having a conventional service processor configuration known in the art is depicted. The illustrated embodiment of server 105 includes a service processor 110 having an independent link to a network 115, a processor 120, a data storage unit ("DSU") 125, a communication link 130, and a system bus 135. Typically, service processor 110 is coupled to the various hardware entities of server 105 via an independent bus 140 and/or direct channels, also called service channels.

An administrator working on a remote console 145 coupled to network 115 can monitor the functionality of processor 120, DSU 125, or other entities (not shown) via interaction with service processor 110. The functions of service processor 110 generally include monitoring one or more of processor 120 (e.g., monitoring the temperature of processor 120), DSU 125, and other entities (not shown), recording hardware errors, performing manual tasks initiated by the administrator (such as resetting processor 120), recovering processor 120 after an error, performing manual input/output data transfers, and the like.

Providing service processor 110 to server 105 adds substantial cost to the overall price of server 105. The additional cost results from the expense related to the service processor itself, the additional dedicated link to the network, and the redundant infrastructure that must be installed into a motherboard of server 105 to provide the out-of-band communication with the various hardware entities of server 105.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for implementing a virtual out-of-band management controller are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In short, embodiments of the present invention implement much of the functionality of a service processor using a virtual runtime monitor software agent. In one embodiment, a processing system is triggered to activate a management mode of operation remotely via a network. Once operating within the management mode of operating, a runtime monitor queries the processing system to determine information regarding one or more hardware entities of the processing system and to convey the information over the network. Once complete, the processing system deactivates the management mode of operation and continues its previous execution. These and other embodiments are described in detail below.

In accordance with one embodiment, a virtual out-of-band management controller may be implemented under an extensible firmware framework standard known as the Extensible Firmware Interface ("EFI") (specifications and examples of which may be found at http://developer.intel.com/technology/efi). EFI is a public industry specification that describes an abstract programmatic interface between platform firmware and shrink-wrap operating systems or other custom application environments. The EFI framework standard includes provisions for extending basic input output system ("BIOS") code functionality beyond that provided by the BIOS code stored in a platform's boot firmware device (e.g., flash memory). More particularly, EFI enables firmware, in the form of firmware modules and drivers, to be loaded from a variety of different resources, including primary and secondary flash devices, option read only memories ("ROMs"), various persistent storage devices (e.g., hard disks, CD ROMs, etc.), and even over computer networks.

Figure 1:
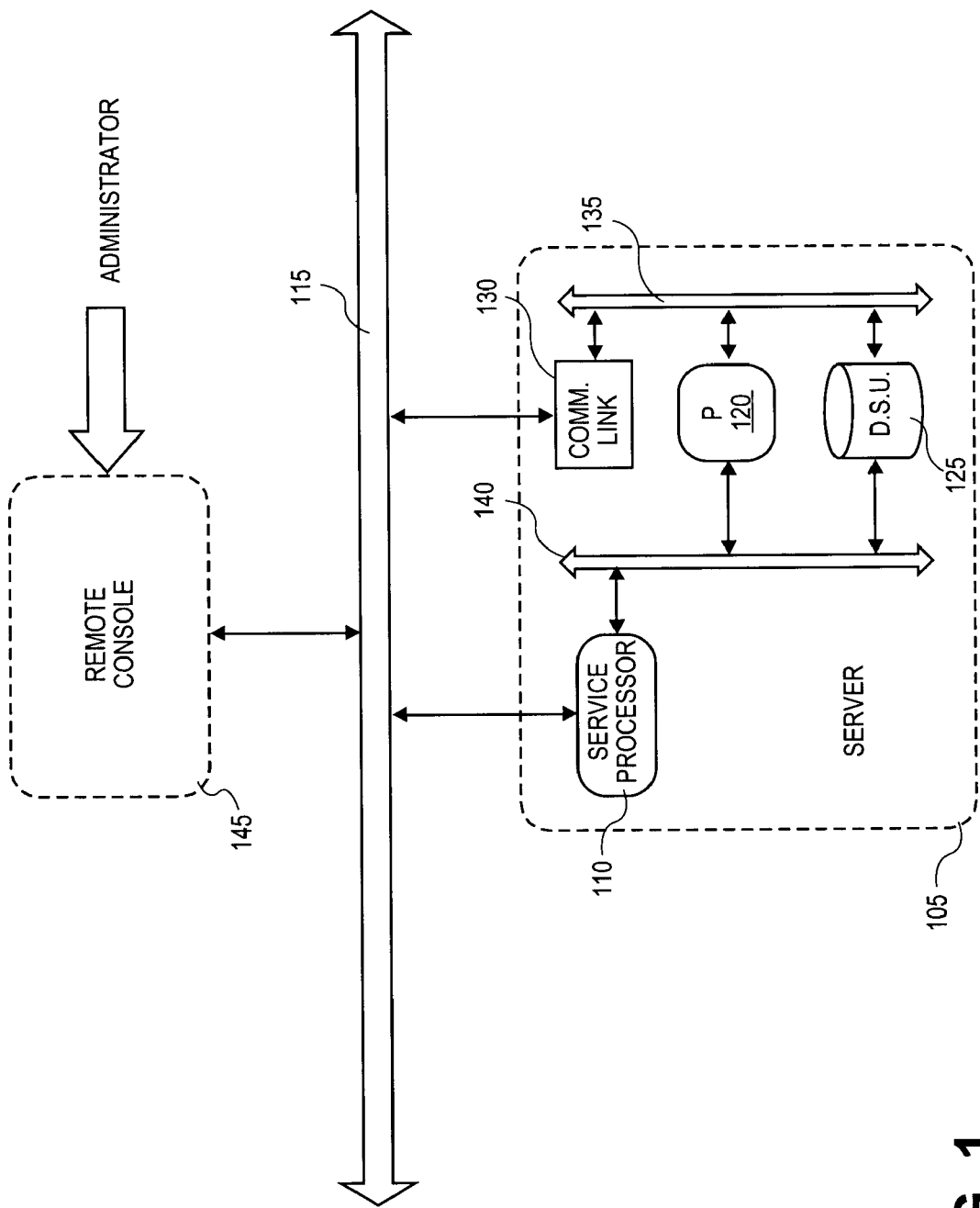
FIG. 1 is a block diagram illustrating a prior art computing system including a service processor to monitor the status of a server.
Figure 2:
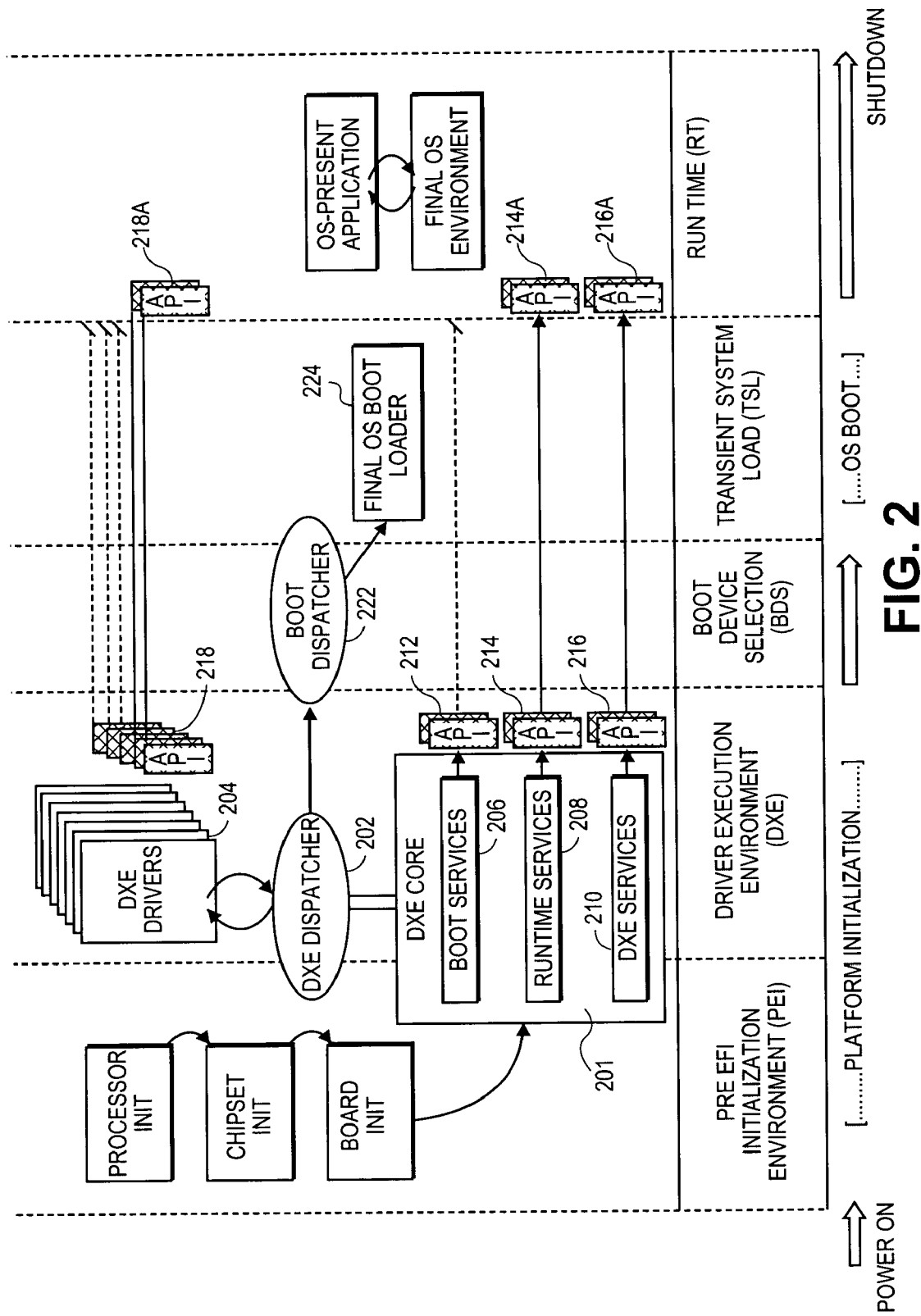
FIG. 2 is a block diagram illustrating various execution phases that are performed pursuant to an Extensible Firmware Interface ("EFI") framework standard, in accordance with an embodiment of the present invention.

FIG. 2 is a block diagram illustrating various execution phases performed by a processing system under one implementation of the EFI framework standard, in accordance with the teachings of the present invention. Various embodiments of the present invention build upon the EFI standard framework to implement a virtual out-of-band management controller.

The EFI standard framework is logically divided into several phases, including a pre-EFI Initialization Environment ("PEI") phase, a Driver Execution Environment ("DXE") phase, a Boot Device Selection ("BDS") phase, a Transient System Load ("TSL") phase, and an operating system run-time ("RT") phase. The phases build upon one another to provide an appropriate runtime environment for the operating system ("OS") and the processing system.

The PEI phase provides a standardized technique of loading and invoking specific initial configuration routines for a processor, a chipset, and a motherboard of the processing system. The PEI phase is responsible for initializing enough of the processing system to provide a stable base for the follow on phases. Initialization of the processing system's core components, including the processor, the chipset and the motherboard is performed during the PEI phase. This phase is also referred to as the "early initialization" phase. Typical operations performed during this phase include the power-on self test ("POST") operations and discovery of various hardware resources. In particular, the PEI phase discovers system memory and prepares a resource map that is handed off to the DXE phase. The state of the processing system at the end of the PEI phase is passed to the DXE phase through a list of position independent data structures called Hand Off Blocks ("HOBs") (not shown).

The DXE phase is the phase during which most of the processing system initialization is performed. The DXE phase is facilitated by several components, including a DXE Core 201, a DXE Dispatcher 202, and a set of DXE drivers 204. DXE Core 201 produces a set of Boot Services 206, Runtime Services 208, and DXE Services 210. DXE Dispatcher 202 is responsible for discovering and executing DXE drivers 204 in the correct order. DXE drivers 204 are responsible for initializing the processor, the chipset, and other hardware components as well as providing software abstractions for console and boot devices. These components work together to initialize the platform and provide the services required to boot the OS. The DXE phase and the BDS phase work together to establish consoles and attempt the booting of the OS. The DXE phase is terminated when the OS successfully begins its boot process (i.e., the BDS phase starts). Runtime services 208 and selected DXE services 210 provided by DXE Core 201 are allowed to persist into the OS runtime environment. The result of the DXE phase is the presentation of a fully formed EFI interface.

In one embodiment, DXE Core 201 is designed to be completely portable with no processor, chipset, or platform dependencies. This embodiment is accomplished with several built-in features. First, DXE Core 201 depends upon the HOB list for its initial state. This means that DXE Core 201 does not depend on services from a previous phase, so all prior phases can be unloaded once the HOB list is passed to DXE Core 201. Second, DXE Core 201 does not contain hard coded addresses. This means that DXE Core 201 can be loaded anywhere in system memory, and it can function correctly no matter where system memory or firmware segments are located in the processor's address space. Third, DXE Core 201 does not contain processor-specific, chipset specific, or hardware specific information. Instead, DXE Core 201 is abstracted from the hardware through a set of architectural protocol interfaces. These architectural protocol interfaces are produced by DXE drivers 204, which are invoked by DXE Dispatcher 202.

Figure 3:
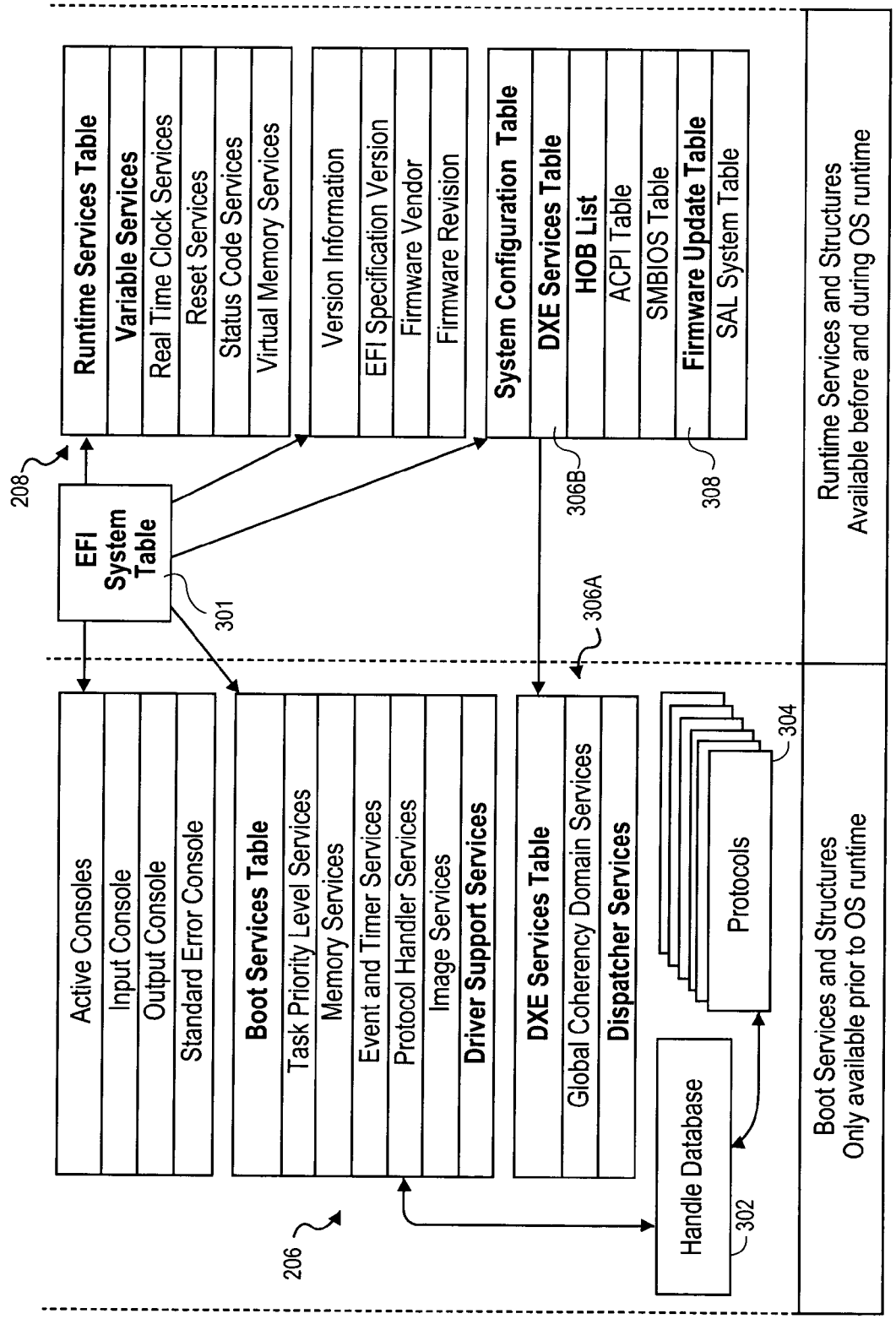
FIG. 3 is a block diagram illustrating various components of an EFI system table, in accordance with an embodiment of the present invention.

FIG. 3 is a block diagram illustrating various components of an EFI system table 301, according to one embodiment of the present invention. DXE Core 201 produces EFI System Table 301 and its associated set of Boot Services 206 and Runtime Services 208. DXE Core 201 also maintains a Handle Database 302. Handle Database 302 includes a list of one or more handles, wherein a handle is a list of one or more globally unique identifiers ("GUIDs") that map to respective Protocols 304. A protocol is a software abstraction for a set of services. Some protocols abstract I/O devices, while other protocols abstract a common set of system services. A protocol typically contains a set of Application Program Interfaces ("APIs") and some number of data fields. Every protocol is named by a GUID, and DXE Core 201 produces services that allow protocols 304 to be registered in Handle Database 302. As DXE Dispatcher 202 executes DXE drivers, additional protocols are added to Handle Database 302 including architectural protocols used to abstract DXE Core 201 from hardware specific details.

Boot Services 206 include a set of services that are used during the DXE phase and the BDS phase. Among others, these services include Memory Services, Protocol Handler Services, and Driver Support Services. The Memory Services provide services to allocate and free memory pages and to allocate and free the memory pool on byte boundaries. It also provides a service to retrieve a map of all the current physical memory usage in the platform. The Protocol Handler Services provide services to add and to remove handles from handle database 302. Additional services are available that allow any component to lookup handles in Handle Database 302, and to open and to close Protocols 304 in Handle Database 302. Driver Support Services provide services to connect and to disconnect drivers to hardware devices in the processing system. These services are used during the BDS phase to either connect all drivers to all devices, or to connect only the minimum number of drivers to devices required to establish the consoles and boot the OS (i.e., for supporting a fast boot mechanism).

In contrast to Boot Services 206, Runtime Services 208 are available both during pre-boot and OS runtime operations. Runtime Services 208 include Variable Services that provide services to lookup, to add, and to remove environmental variables from both volatile and non-volatile storage.

The DXE Services Table includes data corresponding to a first set of DXE services 306A that are available during pre-boot only, and a second set of DXE services 306B that are available during both pre-boot and OS runtime. The pre-boot only services include Global Coherency Domain Services, which provide services to manage I/O resources, memory mapped I/O resources, and system memory resources in the processing system. Also included are DXE Dispatcher Services, which provide services to manage DXE drivers 204 that are being dispatched by DXE Dispatcher 202.

The services offered by each of Boot Services 206, Runtime Services 208, and DXE services 210 are accessed via respective sets of APIs 212, 214, and 216. APIs 212, 214, and 216 provide an abstracted interface that enables subsequently loaded components to leverage selected services provided by DXE Core 201.

After DXE Core 201 is initialized, control is handed to DXE Dispatcher 202. DXE Dispatcher 202 is responsible for loading and invoking DXE drivers 204 found in firmware volumes, which correspond to the logical storage units from which firmware is loaded under the EFI framework standard. DXE Dispatcher 202 searches for drivers in the firmware volumes described by the HOB List. As execution continues, other firmware volumes might be located. When they are located, DXE Dispatcher 202 searches them for drivers as well.

There are two subclasses of DXE drivers 204. The first subclass includes DXE drivers 204 that execute very early in the DXE phase. The execution order of these DXE drivers 204 depends on the presence and contents of an a priori file and the evaluation of dependency expressions. These early DXE drivers 204 will typically contain processor, chipset, and hardware initialization code. These early drivers will also typically produce the architectural protocols that are required for DXE Core 201 to produce its full complement of Boot Services 206 and Runtime Services 208.

The second subclass of DXE drivers 204 are those that comply with the EFI Driver Model (e.g., see EFI Specification, version 1.10, Dec. 1, 2002). These drivers do not perform any hardware initialization when they are executed by DXE Dispatcher 202. Instead, they register a Driver Binding Protocol interface in Handle Database 302. The set of Driver Binding Protocols are used by the BDS phase to connect the drivers to the devices required to establish consoles and provide access to boot devices. DXE Drivers 204 that comply with the EFI Driver Model ultimately provide software abstractions for console devices and boot devices when they are explicitly asked to do so.

Any one of DXE drivers 204 may consume Boot Services 206 and Runtime Services 208 to perform their functions. However, the early DXE drivers need to be aware that not all of these services may be available when they execute because all of the architectural protocols might not have been registered yet. DXE drivers 204 must use dependency expressions to guarantee that the services and protocol interfaces they require are available before they are executed.

DXE drivers 204 that comply with the EFI Driver Model do not need to be concerned with this possibility. These drivers simply register with a Driver Binding Protocol in Handle Database 302 when they are executed. This operation can be performed without the use of any architectural protocols. In connection with registration of the Driver Binding Protocols, a DXE driver may "publish" an API by using an InstallProtocolInterface function. These published drivers are depicted by APIs 218. Under the EFI standard framework, publication of an API exposes the API for access by other firmware components. The APIs provide interfaces for the devices, bus, or services to which DXE drivers 204 correspond during their respective lifetimes.

A BDS architectural protocol executes during the BDS phase. The BDS architectural protocol locates and loads various applications that execute in the pre-boot services environment. Such applications might represent a traditional OS boot loader, or extended services that might run instead of, or prior to loading the final OS. Such extended pre-boot services might include setup configuration, extended diagnostics, flash update support, original equipment manufacturer ("OEM") value-adds, or the OS boot code. A Boot Dispatcher 222 is used during the BDS phase to enable selection of a boot target, e.g., an OS to be booted by the processing system.

During the TSL phase, a final OS Boot loader 224 is run to load the selected OS. Once the OS has been loaded, there is no further need for Boot Services 206, and for many of the services provided in connection with DXE drivers 204 via APIs 218, as well as DXE Services 306A. Accordingly, these reduced sets of APIs that may be accessed during the OS runtime are depicted as APIs 216A and 218A in FIG. 2. APIs 214 provide for Runtime Services so are also shown in FIG. 2 to be available during the OS runtime.

Figure 4:
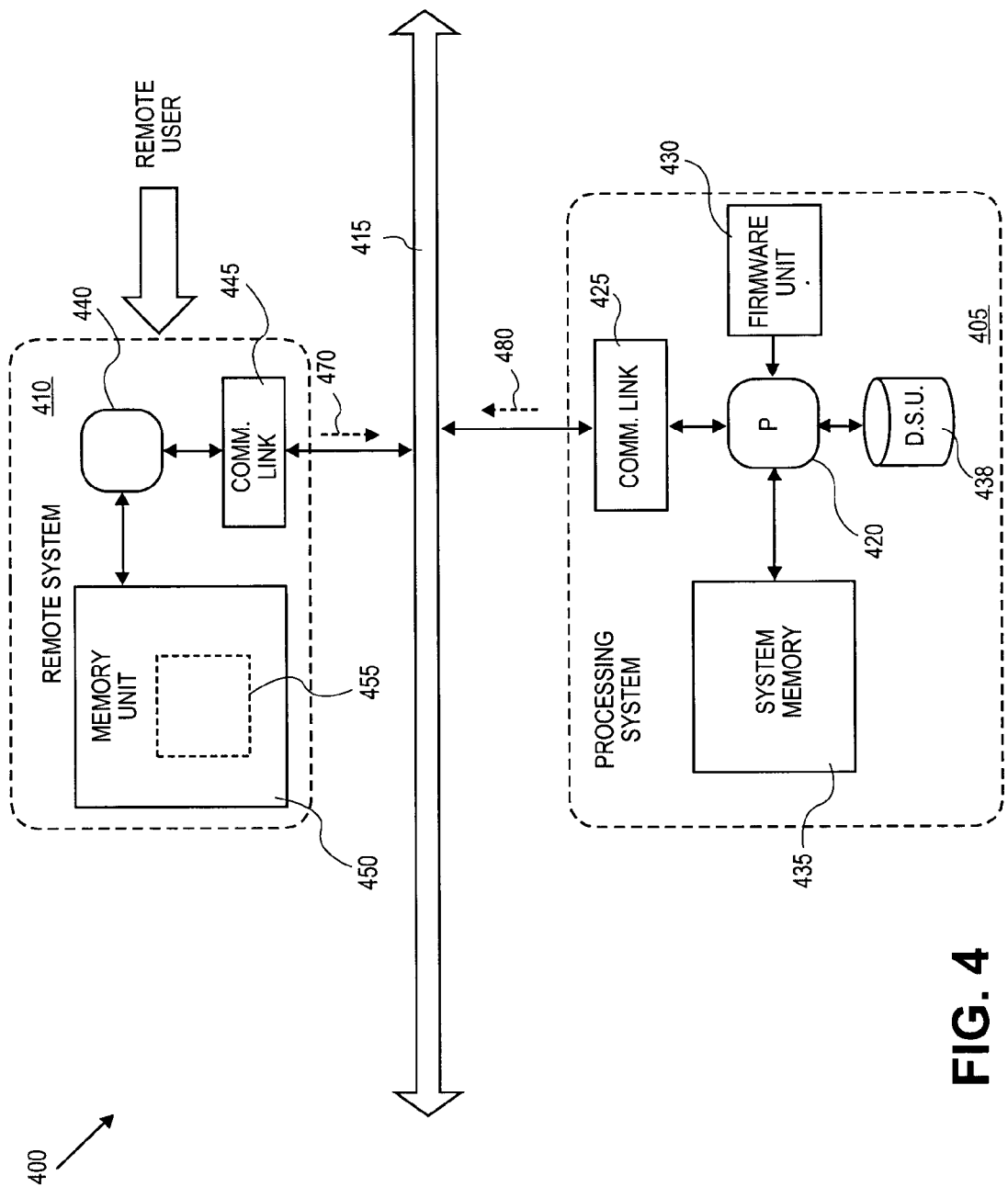
FIG. 4 is a block diagram illustrating a system to implement a virtual out-of-band management controller, in accordance with an embodiment of the present invention.

FIG. 4 is a block diagram illustrating a system 400 to implement a virtual out-of-band management controller, according to the teachings of the present invention. The illustrated embodiment of system 400 includes a processing system 405, a remote system 410, and a network 415. The illustrated embodiment of processing system 405 includes a processor 420, a communication link 425, a firmware unit 430, system memory 435, and a data storage unit ("DSU") 438. The illustrated embodiment of remote system 410 includes a processor 440, a communication link 445, and a memory unit 450.

The elements of system 400 are interconnected as follows. Processor 420 of processing system 405 is communicatively coupled to communication link 425, firmware unit 430, and system memory 435 to send and to received instructions thereto/therefrom. In one embodiment, firmware unit 430 is a flash memory device. In other embodiments, firmware unit 430 includes any one of read only memory ("ROM"), programmable ROM, erasable programmable ROM, electrically erasable programmable ROM, or the like. In one embodiment, system memory 435 includes random access memory ("RAM"). In one embodiment, communication link 425 includes a network interface card ("NIC"). DSU 438 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

Similarly, processor 440 of remote system 410 is communicatively coupled to memory unit 450 and to communication link 445. Both communication links 425 and 445 are communicatively coupled to network 415 enabling processors 420 and 440 to send and to receive instruction to/from each other. Network 415 may include a wired and/or a wireless network, such as a local area network ("LAN"), a wide area network ("WAN"), or the Internet.

It should be appreciated that various other elements of processing system 405 and remote system 410 have been excluded from FIG. 4 and this discussion for the purposes of clarity. For example, remote system 410 may further include one or more data storage units, such as a hard disk communicatively coupled to processor 440.

In one embodiment, processing system 405 and remote system 410 are coupled to enable a remote user of remote system 410 to trigger processing system 405 to activate a management mode of operating. In one embodiment, the remote user can interact with a runtime monitor executing on processing system 405 during the management mode of operating to query processing system 405 for information relating to its operative status. In one embodiment, the remote user can perform various other input/output ("I/O") requests with aid of the runtime monitor across network 415. In one embodiment, a software agent 455 executing on remote system 410 triggers processing system 405 to activate the management mode of operation and interacts with the runtime monitor to perform I/O requests. These and other embodiments are described in detail below.

Figure 5:
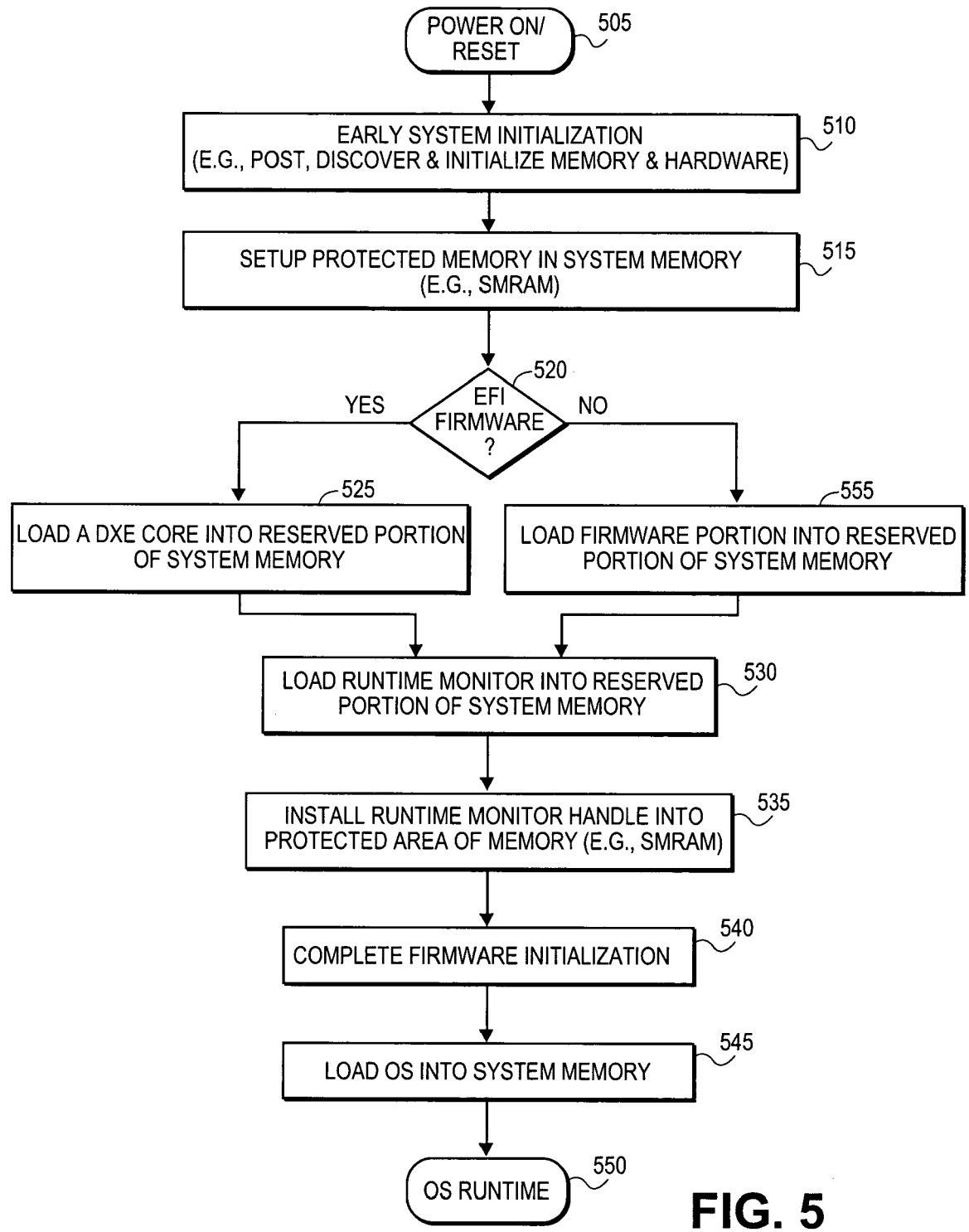
FIG. 5 is a flow chart illustrating a process for setting up an operating environment to implement a virtual out-of-band management controller, in accordance with an embodiment of the present invention.

FIG. 5 is a flow chart illustrating a process 500 for setting up an operating environment to implement a virtual out-of-band management controller, in accordance with the teachings of the present invention. In a process block 505, processing system 405 starts up after being powered-on from an off state or reset from an on state. In a process block 510, processing system 405 executes early system initialization tasks. In some situations, early system initialization includes tasks such as POST, discovering memory resources, and initializing the memory resources, but may further include discovering platform hardware and initializing platform hardware and the like. In an example where processing system 405 executes firmware according to the EFI standard framework, process block 510 includes at least the PEI phase, but may optionally include the DXE phase.

Figure 6:
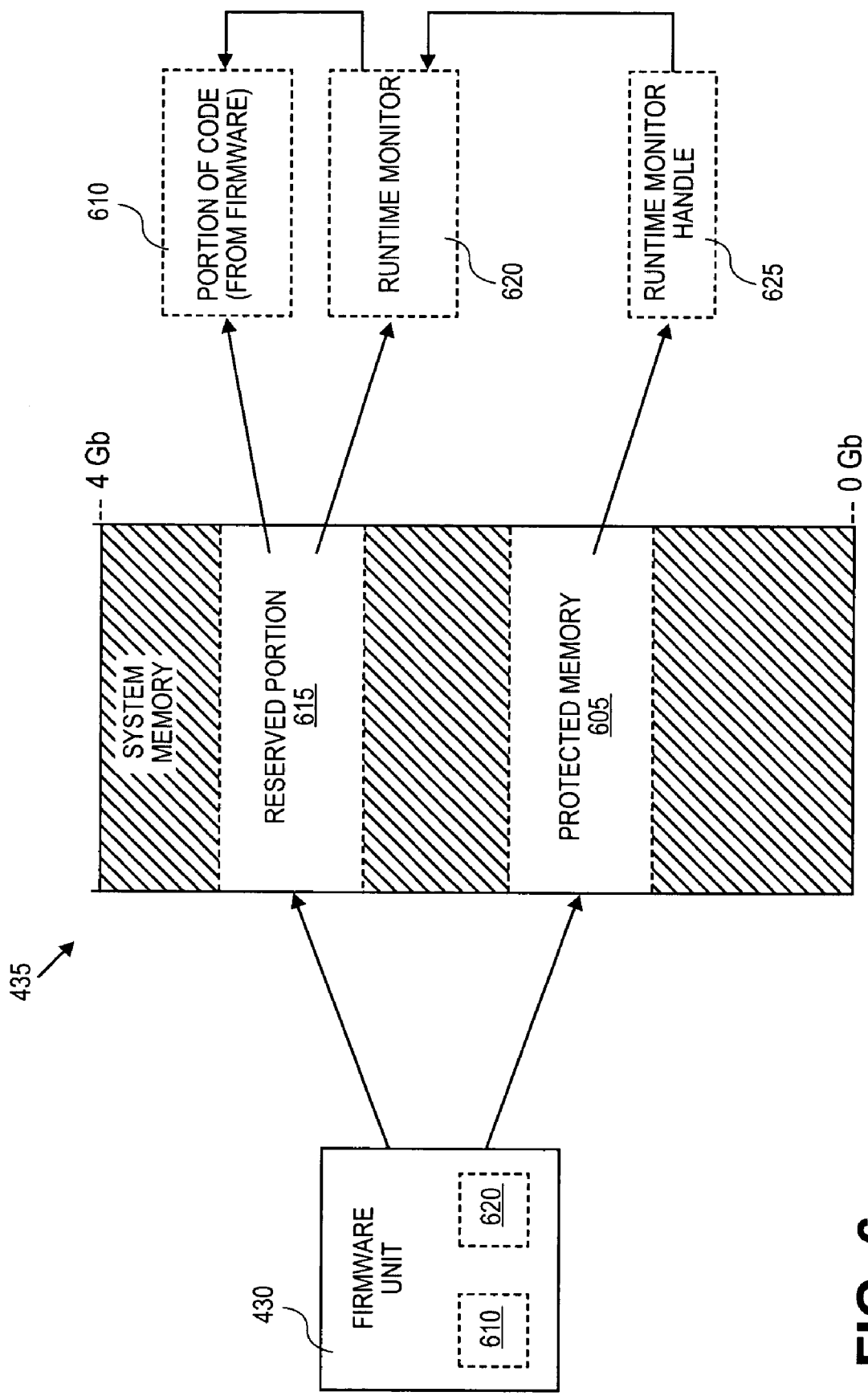
FIG. 6 is a block diagram illustrating linked software agents for implementing a virtual out-of-band management controller, in accordance with an embodiment of the present invention.

Referring to FIG. 5 and FIG. 6, processor 420 allocates a portion of system memory 435 as protected memory 605, in a process block 515. Protected memory 605 is allocated and set aside for code intended to execute during the system management mode of operation of processor 420. In one embodiment, when the firmware generates a memory map to be handed off to the OS, protected memory 605 is excluded from the memory map, thereby protecting applications stored in protected memory 605. In one embodiment, protected memory is a system management RAM ("SMRAM") and the management mode of operation is one embodiment of the system management mode ("SMM") specified by the *IA-32 Intel Architecture Software Developer's Manual, Volume* 3: *System Programming Guide* (2003) made available by Intel® Corporation. Since the 386SL processor was introduced by the Intel® Corporation, SMM has been available on 32-bit Intel Architecture ("IA-32") processors as an operation mode hidden to operating systems that executes code loaded by firmware. SMM is a special-purpose operating mode provided for handling system-wide functions like power management, system hardware control, or proprietary original equipment manufacturer ("OEM") designed code. The mode is deemed "hidden" because the OS and OS runtime software applications cannot see it, or even access it. Only applications executed during SMM have access to SMRAM.

In a decision block 520, process 500 branches along one of two paths depending upon whether firmware unit 430 includes firmware code compliant with the EFI standard framework or other non-EFI only code (e.g., legacy BIOS only). If firmware unit 430 includes firmware code complaint with the EFI standard framework, then process 500 continues to a process block 525.

In a process block 525 and referring to FIG. 6, processor 420 loads (e.g., copies) a portion of code 610 from firmware unit 430 into a reserved portion 615 of system memory 435. In this case, firmware unit 430 contains firmware code compliant with the EFI standard framework. Therefore, portion of code 610 includes DXE core 201 responsible for executing the DXE phase described above (e.g., hardware initialization and discovery, launching hardware drivers such as DXE driver 204).

In a process block 530, processor 420 loads (e.g., copies) a runtime monitor 620 from firmware unit 430 into reserved portion 615 of system memory 435. In one embodiment, runtime monitor 620 is an EFI application. In a process block 535, processor 420 installs a runtime monitor handle 625 into protected memory 605. Runtime monitor handle 625 is responsible for appropriately invoking runtime monitor 620 when the management mode of operation is activated.

In a process block 540, firmware completes initialization of the pre-boot environment and prepares to launch the OS loader to hand over control of processing system 405 to the OS. In a process block 545, the OS loader loads the OS from a storage device, such as DSU 438. Once the OS is loaded into system memory 435, processor 420 enters OS runtime in a process block 550. When the memory map of system memory 435 is handed off to the OS, protected memory 605 and reserved portion 615 are either excluded from the memory map such that the OS is unaware of their existence or deemed untouchable to the OS during OS runtime.

Returning to decision block 520, if firmware unit 430 does not include firmware code complaint with the EFI standard framework, then process 500 continues to a process block 555. In process block 555, portion of code 610 loaded from firmware unit 430 into reserved portion 615 is a portion of non-EFI firmware responsible for discovering and initializing hardware entities of processing system 405. Thus, the portion of the non-EFI firmware would execute similar functions to that executed by DXE core 201 with respect to providing APIs for interacting with hardware entities. Upon completion of decision block 555, process 500 continues to process block 530 and continues as described above.

It should be appreciated that the illustrated order of the process blocks of process 500 is only one possible order. The order of several of the process blocks may be reordered within the scope of the present invention. Furthermore, other embodiments of the present invention include runtime monitor 620 stored in other non-volatile storage devices (e.g., option ROMs, hard disks, etc.) and loaded therefrom into reserved portion 615 of system memory 435. Similarly, other embodiments include portion of code 610 being stored in other non-volatile storage devices (e.g., option ROMs, hard disks, etc.) and loaded therefrom into reserved portion 615.

Figure 7:
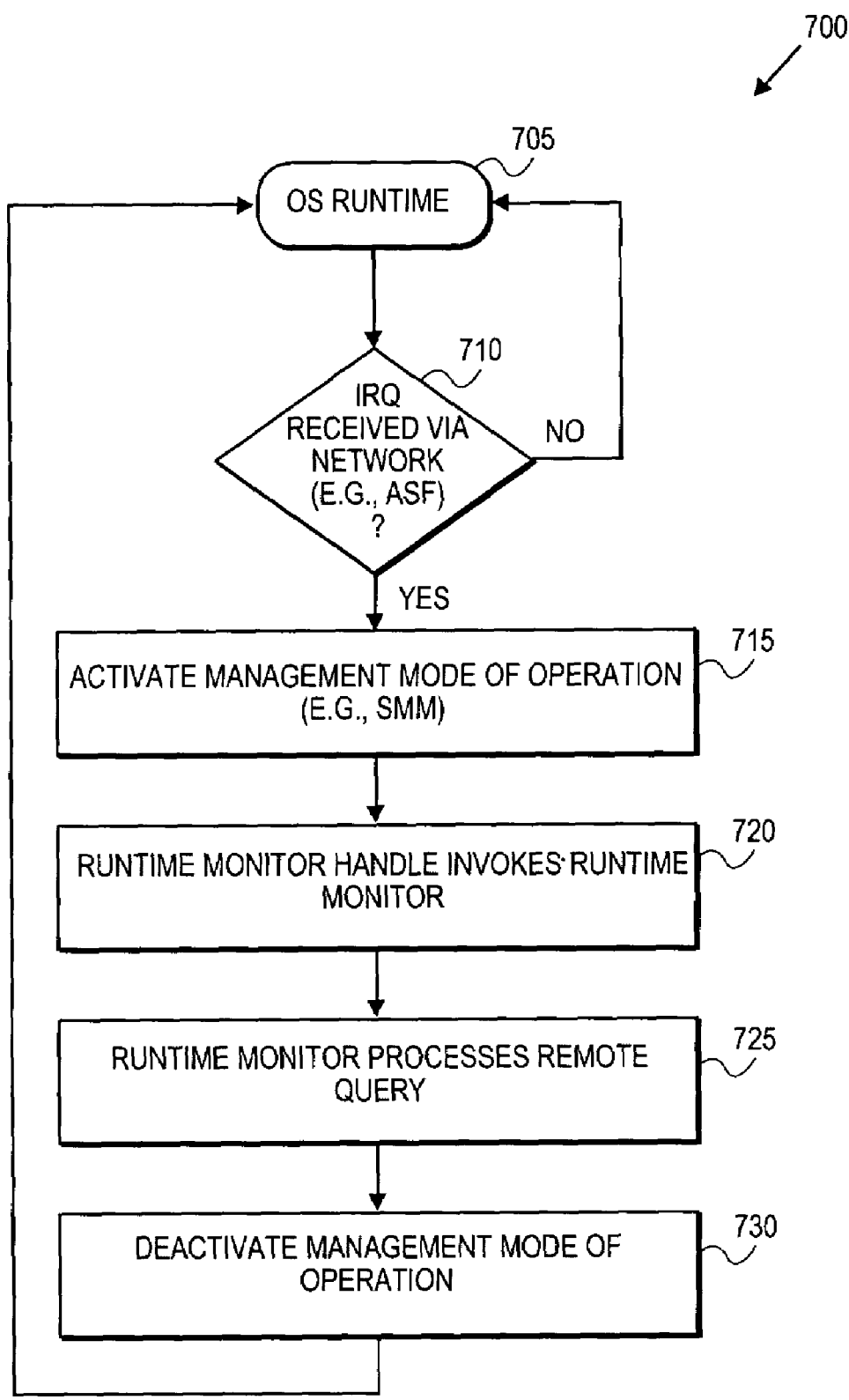
FIG. 7 is a flow chart illustrating a process for implementing a virtual out-of-band management controller, in accordance with an embodiment of the present invention.

FIG. 7 is a flow chart illustrating a process 700 for implementing a virtual out-of-band management controller, in accordance with an embodiment of the present invention. In a process block 705, processing system 405 is operating in the OS runtime. Process block 705 corresponds to process block 550 in FIG. 5.

In a decision block 710, processing system 405 receives an interrupt request via network 415, illustrated as a signal 470 in FIG. 4. Signal 470 is transmitted to processing system 405 from remote system 410 via network 415. In one embodiment, the remote user of remote system 410 manually initiates the transmission of signal 470. In one embodiment, software agent 455 automatically initiates the transmission of signal 470 according to a programmed behavior. Software agent 455 may be programmed to transmit signal 470 according to a predetermined policy (e.g., regular intervals) or it may transmit signal 470 in response to a specific event (e.g., processing system 405 not responding to network calls). In one embodiment, signal 470 is an interrupt signal defined by the Alert Standard Format ("ASF") Specification, v1.03, Jun. 2, 2001 by Distributed Management Task Force, Inc.

In a process block 715, processing system 405 activates a management mode of operation in response to receiving signal 470. In one embodiment, communication link 425 is configured to trigger the management mode of operation in response to receiving signal 470. In one embodiment, signal 470 triggers processing system 405 to activate the SMM. In one embodiment where processor 420 is an IA-32 processor, a system management interrupt ("SMI") is generated in response to signal 470. The SMI in turn activates the SMM. A similar signal called a processor management interrupt ("PMI") is roughly analogous to the SMI signal is used for Itanium™-class processors. For simplicity, both SMI and PMI signals are sometimes referred to as xMI signals heretofore. When an event generates an xMI (e.g., signal 470 received via communication link 425), processor 420 responds by saving a substantial part of its current state in a state save map, initializes some registers to provide the SMM execution environment, and then begins execution inside SMM.

In a process block 720, runtime monitor handle 625, which resides within protected memory 605 (e.g., SMRAM), is executed upon entering the protected mode of operation (e.g., SMM). In one embodiment, runtime monitor handle 625 invokes runtime monitor 620, which resides in reserved portion 615 of system memory 435, if the protected mode of operation was triggered by communication link 425. In one embodiment, runtime monitor handle 625 is configured to invoke runtime monitor 620 depending on a status flag set in response to signal 470. It should be appreciated that runtime monitor handle 720 may be configured to invoke runtime monitor 620 using various other techniques within the spirit of the present invention.

Once invoked, runtime monitor 620 can query various aspects of processing system 405 to convey information 480 about processing system 405 to remote system 410 (process block 725). In order to interact (e.g., query) with various hardware entities of processing system 405, runtime monitor 620 invokes/executes portion of code 610 copied from firmware unit 430 into reserved portion 615 of system memory 435. Portion of code 610 includes device drivers necessary to initialize, configure and/or otherwise interact with the various hardware entities of processing system 405 during the management mode of operation. Thus, in effect runtime monitor 620 re-executes a subset of the pre-boot phase of processing system 405. In one embodiment having firmware compliant with the EFI standard framework, portions of DXE core 201 are re-executed. In most situations, runtime monitor 620 will only invoke portions of firmware code that will not corrupt non-restorable state data (i.e., state data that was not saved and cannot be restored upon exiting the management mode of operation).

In one embodiment, runtime monitor 620 may optionally transmit a hand-shaking packet to remote system 410 indicating that runtime monitor 620 is ready to receive and process remote requests for information. In some situations, software agent 455 executing on remote system 410 can automatically generate these remote requests and queue information 480 transmitted by runtime monitor 620 in response. In some situations, the remote user of remote system 410 can manual generate remote requests and information 480 transmitted in response can be displayed on a terminal of remote system 410 for inspection by the remote user. In one embodiment, runtime monitor 620 automatically queries a variety of predetermined aspects of processing system 405 in response to invocation and transmits results of the automated querying to remote system 410 in the form of information 480.

Information 480 may contain a variety of data relating to processing system 405. For example, information 480 may contain status information about one or more hardware entities of processing system 405 (e.g., processor 420, system memory 435, firmware unit 430, communication link 425, DSU 438, an add-in card, and the like). Information 480 may include status information such as runtime errors, system failures, temperature readings, memory usage, performance statistics, runtime logs, and the like.

In one embodiment, runtime monitor 620 can optionally execute remote input/output ("I/O") requests. For example, runtime monitor 620 may optionally be configured to execute memory dumps from system memory 435 across network 415, reset processing system 405, and the like. Upon completion of querying processing system 405 and/or performing remote I/O requests, process 700 continues to a process block 730.

In a process block 730, processing system 405 deactivates the management mode of operation. Upon deactivating the management mode of operation processor 420 loads state information saved just prior to activating the management mode of operation and resumes OS runtime execution (process block 705) from a saved program point just prior to activating the management mode of operation in process block 715.

It should be appreciated that in order to mimic the tasks executed by an out-of-band management controller, runtime monitor 620 executes its tasks (e.g., querying, servicing remote I/O request, etc.) in a time sensitive manner. If for example, just prior to activating the management mode of operation, processing system 405 was communicating with another remote system coupled to network 415, processing system 405 should execute process 700 prior to the communication session with the other remote system timing out. In other words, processing system 405 should activate the management mode of operation, runtime monitor 620 perform its requested tasks, and processing system 405 deactivate the management mode of operation prior to communications with the other remote system timing out. Thus, in some situations runtime monitor 620 may segment its tasks over multiple iterations of process 700.

Embodiments of the present invention replace the need for a hardware implementation of a management controller, such as a service processor. By implementing the functionality of a service processor virtually using the software techniques described above, the cost associated with high-end servers is decreased. Furthermore, embodiments of the present invention enable OEM platform designers to build in the functionality of a service processor, normally only provided in high end systems, into lower-end economical systems.

Figure 8:
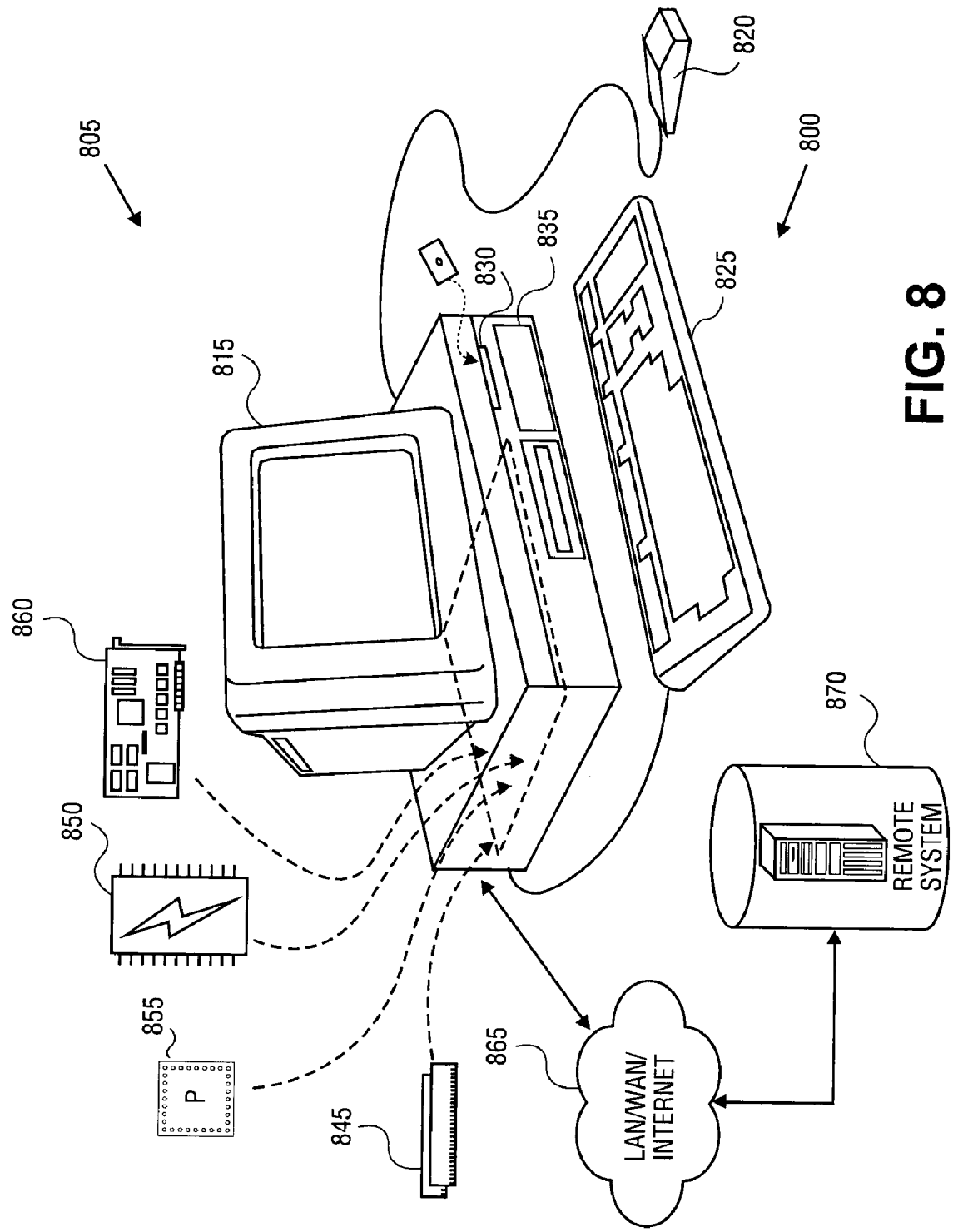
FIG. 8 illustrates an exemplary processing system to implement a virtual out-of-band management controller, in accordance with an embodiment of the present invention.

FIG. 8 illustrates one embodiment of a system 800 for implementing a virtual out-of-band management controller, in accordance with an embodiment of the present invention. A computer 805 (corresponding to one embodiment of processing system 405) includes a chassis 810, a monitor 815, a mouse 820 (or other pointing device), and a keyboard 825. The illustrated embodiment of chassis 810 further includes a floppy disk drive 830, a hard disk 835, a power supply (not shown), and a motherboard 840 populated with appropriate integrated circuits including system memory 845 (corresponding to system memory 435), firmware unit 850 (corresponding to firmware unit 430), and one or more processors 855 (corresponding to processor 420).

In one embodiment, a NIC 860 (corresponding to communication link 425) is coupled to an expansion slot (not shown) of motherboard 840. NIC 860 is for connecting computer 805 to a network 865, such as a local area network, wide area network, or the Internet. Network 865 is further coupled to a remote system 870, such that computer 805 and remote system 870 can communicate.

Hard disk 835 may comprise a single unit, or multiple units, and may optionally reside outside of computer 805. Monitor 815 is included for displaying graphics and text generated by software and firmware programs run by computer 815. Mouse 820 (or other pointing device) may be connected to a serial port, USB port, or other like bus port on motherboard 840. Keyboard 825 is communicatively coupled to motherboard 840 via a keyboard controller or other manner similar to mouse 820 for user entry of text and commands.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    copying a portion of code from a firmware unit into system memory, the portion of code including discovery and initialization code;
    activating a management mode of operation in response to a signal received via a network;
    executing the discovery and initialization code during the management mode of operation to discover and initialize at least one hardware entity of a processing system;
    executing a runtime monitor during the management mode of operation, the runtime monitor to determine information about the at least one hardware entity via executing the discovery and initialization code, the runtime monitor to transmit the information over the network; and
    deactivating the management mode of operation.

2. The method of claim 1 wherein copying the portion of code from the firmware unit includes copying the discovery and initialization code into a reserved portion of system memory.

3. The method of claim 2 wherein the copying the discovery and initialization code includes copying driver execution environment ("DXE") code executed during a DXE phase of an extensible firmware interface ("EFI") framework standard.

4. The method of claim 2 wherein the discovery and initialization code is copied into the reserved portion of system memory during a pre-boot runtime.

5. The method of claim 1 wherein activating the management mode of operation includes activating a system management mode ("SMM") in response to a system management interrupt ("SMI"), the SMI triggered in response to the signal received via the network.

6. The method of claim 1 wherein executing the runtime monitor to determine the information includes executing the runtime monitor in response to requests for the information received via the network.

7. The method of claim 6 wherein the information includes at least one of a temperature reading of the at least one hardware entity, an execution log of the at least one hardware entity, and a memory image of the at least one hardware entity.

8. The method of claim 1 wherein executing the runtime monitor further includes executing tasks in response to commands received via the network.

9. The method of claim 8 wherein the tasks include resetting the at least one hardware entity, performing input/output data transfers with the at least one hardware entity via the network, generating execution logs relating to the at least one hardware entity, and turning the at least one hardware entity off.

10. The method of claim 1 wherein the at least one hardware entity includes a processor, the firmware unit, the system memory, a communication link, and an adapter card.

11. A machine-readable storage medium that provides instructions that, if executed by a machine, will cause the machine to perform operations comprising:
    copying a portion of code from a firmware unit into a reserved portion of system memory;
    copying a runtime monitor from the firmware unit into the reserved portion of system memory;
    copying a runtime monitor handle from the firmware unit into a protected memory that is distinct from the reserved portion of system memory, the runtime monitor handle to invoke the runtime monitor during a management mode of operation;
    activating the management mode of operation in response to a signal received via a network;
    executing the portion of code during the management mode of operation to interact with at least one hardware entity of the machine;
    executing the runtime monitor during the management mode of operation, the runtime monitor to determine information about the at least one hardware entity via executing the portion of code, the runtime monitor to transmit the information over the network; and
    deactivating the management mode of operation.

12. The machine-readable storage medium of claim 11, further embodying instructions that, if executed by the machine, will cause the machine to perform the operations wherein the protected memory is system management random access memory ("SMRAM").

13. The machine-readable storage medium of claim 11, further embodying instructions that, if executed by the machine, will cause the machine to perform the operations wherein:
    copying the portion of code includes copying driver execution environment ("DXE") code executed during a DXE phase of an extensible firmware interface ("EFI") framework standard.

14. The machine-readable storage medium of claim 13, further embodying instructions that, if executed by the machine, will cause the machine to perform the operations wherein the DXE code is copied into the reserved portion of system memory during a pre-boot runtime.

15. The machine-readable storage medium of claim 13 further embodying instructions that, if executed by the machine, will cause the machine to perform the operations wherein:
    executing the portion of code copied from the firmware unit includes executing the DXE code.

16. The machine-readable storage medium of claim 11, further embodying instructions that, if executed by the machine, will cause the machine to perform the operations wherein:

activating the management mode of operation includes activating a system management mode ("SMM") in response to a system management interrupt ("SMI"), the SMI triggered in response to the signal received via the network.

17. The machine-readable storage medium of claim 11, further embodying instructions that, if executed by the machine, will cause the machine to perform the operations wherein:
executing the runtime monitor to determine the information includes executing the runtime monitor in response to requests for the information received via the network.

18. The machine-readable storage medium of claim 17, further embodying instructions that, if executed by the machine, will cause the machine to perform the operations wherein the information includes at least one of a temperature reading of the at least one hardware entity, an execution log of the at least one hardware entity, and a memory image of the at least one hardware entity.

19. The machine-readable storage medium of claim 11, further embodying instructions that, if executed by the machine, will cause the machine to perform the operations wherein:
executing the runtime monitor further includes executing tasks in response to commands received via the network, the tasks including one or more of resetting the at least one hardware entity, performing input/output data transfers with the at least one hardware entity via the network, generating execution logs relating to the at least one hardware entity, and turning the at least, one hardware entity off.

20. The machine-readable storage medium of claim 11, further embodying instructions that, if executed by the machine, will cause the machine to perform the operations wherein the at least one hardware entity includes a processor, the firmware unit, the system memory, a communication link, and an adapter card.

21. A processing system, comprising:
a processor to execute instructions in both a system management mode ("SSM") and an operating system ("OS") runtime mode of operation;
a hardware entity communicatively coupled to the processor;
a communication link communicatively coupled to the processor; and
a flash memory unit communicatively coupled to the processor and having stored therein a runtime monitor, the runtime monitor to execute during the SMM to determine information about the hardware entity and to transmit the information over a network via the communication link, wherein the SMM is activated by an interrupt generated in response to a signal received from the network via the communication link, wherein the processor copies at least a portion of hardware discovery and initialization code being stored in the flash memory unit into the system memory during a pre-boot runtime of the processor, the processor to execute the discovery and initialization code during the SMM to enable the runtime monitor to interact with the hardware entity.

22. The processing system of claim 21, further comprising system memory communicatively coupled to the processor, the processor to copy the runtime monitor into the system memory and to execute the runtime monitor during the SMM therefrom.

23. The processing system of claim 22 wherein the discovery and initialization code comprises driver execution environment ("DXE") code executed during a DXE phase of an extensible firmware interface ("EFI") framework standard to initialize the processing system.

24. The processing system of claim 21 wherein the SMM is activated in response to a system management interrupt ("SMI"), the SMI triggered in response to the signal received from the network.

25. The processing system of claim 21 wherein the information includes at least one of a temperature reading of the hardware entity, an execution log of the hardware entity, a status report of the hardware entity, and a memory image of the hardware entity.

26. The processing system of claim 25 wherein the hardware entity includes one of the processor, system memory, the flash memory unit, the communication link, and an adapter card.

27. The processing system of claim 21 wherein the runtime monitor further executes tasks in response to commands received via the network during the SMM.

28. The processing system of claim 21, further comprising a plurality of hardware entities, the runtime monitor to execute during the SMM to determine information about the plurality of hardware entities and to transmit the information over a network via the communication link.

* * * * *